United States Patent [19]

Goldman et al.

[11] E Re. 30,579

[45] Reissued Apr. 14, 1981

[54] CHECK AUTHORIZATION SYSTEM

[75] Inventors: Robert N. Goldman, Kailua, Hi.; Ronald A. Katz, Los Angeles, Calif.

[73] Assignee: Telecredit, Inc., Los Angeles, Calif.

[21] Appl. No.: 846,356

[22] Filed: Oct. 28, 1977

Related U.S. Patent Documents

Reissue of:

[64] Patent No.: 3,212,062
Appl. No.: 102,486
Filed: Apr. 12, 1961

[51] Int. Cl.[3] ..... G06F 15/20; G06K 5/00; H04Q 3/58

[52] U.S. Cl. ..... 340/149 R; 235/375; 235/380

[58] Field of Search ..... 340/172.5, 149 A, 152, 340/149 R; 235/380, 419, 375; 364/401

[56] References Cited

U.S. PATENT DOCUMENTS

| | | | |
|---|---|---|---|
| Re. 26,830 | 3/1970 | Wilcox | 340/152 |
| 939,245 | 10/1909 | Greenwald . | |
| 975,533 | 11/1910 | Kettering . | |
| 1,122,605 | 12/1914 | Kettering . | |
| 1,218,563 | 3/1917 | Johnson . | |
| 1,321,900 | 3/1921 | Dorsey et al. . | |
| 1,372,804 | 8/1920 | Dorsey et al. . | |
| 1,385,788 | 7/1921 | Kirshner . | |
| 1,644,229 | 10/1927 | Block . | |
| 2,018,420 | 10/1935 | Robinson | 178/3 |
| 2,157,860 | 5/1939 | Nelson | 179/2 |
| 2,224,244 | 12/1940 | Hicks | 179/6 |
| 2,298,487 | 10/1942 | Kiner | 179/2 |
| 2,357,455 | 9/1944 | Bryce | 235/61.9 |
| 2,408,754 | 10/1946 | Busch | 178/79 |
| 2,446,037 | 7/1948 | Ammann | 177/353 |
| 2,535,218 | 12/1950 | Marble | 235/61 |
| 2,549,071 | 4/1951 | Dusek | 177/353 |
| 2,611,813 | 9/1952 | Sharpless | 177/353 |
| 2,674,728 | 4/1954 | Potter | 340/174 |
| 2,689,338 | 9/1954 | Singleton | 340/152 |
| 2,714,201 | 7/1955 | Whitehead | 340/149 |
| 2,737,342 | 3/1956 | Nelson | 235/61 |
| 2,785,388 | 3/1957 | McWhirter | 340/149 |
| 2,883,106 | 4/1959 | Cornwell | 235/61.6 |
| 2,900,132 | 8/1959 | Burns | 235/61.7 |
| 2,902,541 | 9/1959 | Singleton | 179/2 |
| 2,910,238 | 10/1959 | Miles | 235/167 |
| 2,954,166 | 9/1960 | Eckdahl | 235/159 |
| 2,980,758 | 4/1961 | Goldwater | 178/4 |
| 2,982,472 | 5/1961 | Huskey | 235/167 |
| 2,995,729 | 8/1961 | Steele | 340/172.5 |
| 3,035,764 | 5/1962 | Beman | 235/61.9 |
| 3,037,192 | 5/1962 | Everett | 340/172.5 |
| 3,038,582 | 7/1962 | Frenchette . | |
| 3,039,582 | 6/1962 | Sinjian | 194/4 |
| 3,069,496 | 12/1962 | Blinken | 178/17 |
| 3,082,402 | 3/1963 | Scantlin | 340/152 |
| 3,097,347 | 7/1963 | Simjian | 340/147 |
| 3,107,343 | 10/1963 | Poole | 340/172.5 |
| 3,121,159 | 2/1964 | Rogal | 235/61.6 |
| 3,133,268 | 5/1964 | Avakian | 340/152 |
| 3,153,775 | 10/1964 | Marsh | 340/172.5 |
| 3,165,045 | 1/1965 | Troll | 95/4.5 |
| 3,184,714 | 5/1965 | Brown | 340/149 |
| 3,197,742 | 7/1965 | Rettig | 340/172.5 |
| 3,200,194 | 8/1965 | Rabinow | 178/6 |
| 3,205,480 | 9/1965 | Simjian | 340/146.3 |
| 3,221,306 | 11/1965 | Hayes | 340/172.5 |
| 3,231,861 | 1/1966 | French | 340/149 |
| 3,281,789 | 10/1966 | Willcox | 340/152 |
| 3,308,238 | 3/1967 | Brotaman | 179/2 |
| 3,308,439 | 3/1967 | Tink | 340/172.5 |
| 3,315,230 | 4/1967 | Weingart | 340/149 |
| 3,335,411 | 8/1967 | Sinn | 340/172.5 |
| 3,344,258 | 10/1967 | Michels . | |
| 3,345,612 | 10/1967 | Goldman | 340/172.5 |
| 3,353,006 | 11/1967 | Pollock | 235/61.7 |
| 3,375,500 | 3/1968 | Fowler | 340/172.5 |
| 3,394,246 | 7/1968 | Goldman | 235/61.7 |
| 3,407,387 | 10/1968 | Looschen | 340/152 |
| 3,465,289 | 9/1969 | Klein | 340/149 |
| 3,511,940 | 5/1970 | Lemelson | 179/100.2 |
| 3,513,298 | 5/1970 | Riddle et al. . | |
| 3,544,769 | 1/1970 | Hedin | 235/61.11 |

*Primary Examiner*—Robert M. Kilgore
*Attorney, Agent, or Firm*—Nilsson, Robbins, Dalgarn, Berliner, Carson & Wurst

[57] ABSTRACT

*A system is disclosed for providing financial status data from a data processing system to a plurality of input units. Operation is based on identification verification, personal*

*history records, and current activity of subjects. Subjects are verified using two classes of identification, one that is characteristic of a subject and another that is arbitrarily assigned. Arbitrary identification signals designate a memory location for a subject's status and characteristic identification. A comparison between recorded and inquiry identification confirms a subject's identity. The system includes apparatus for accepting and recording identifications for first-time subjects. Memory also registers personal history, for example, negative information on subjects which is provided as one form of status data. Records of a subject's recent activity are generated in the memory to indicate another form of status data.*

9 Claims, 3 Drawing Figures

FIG. 1
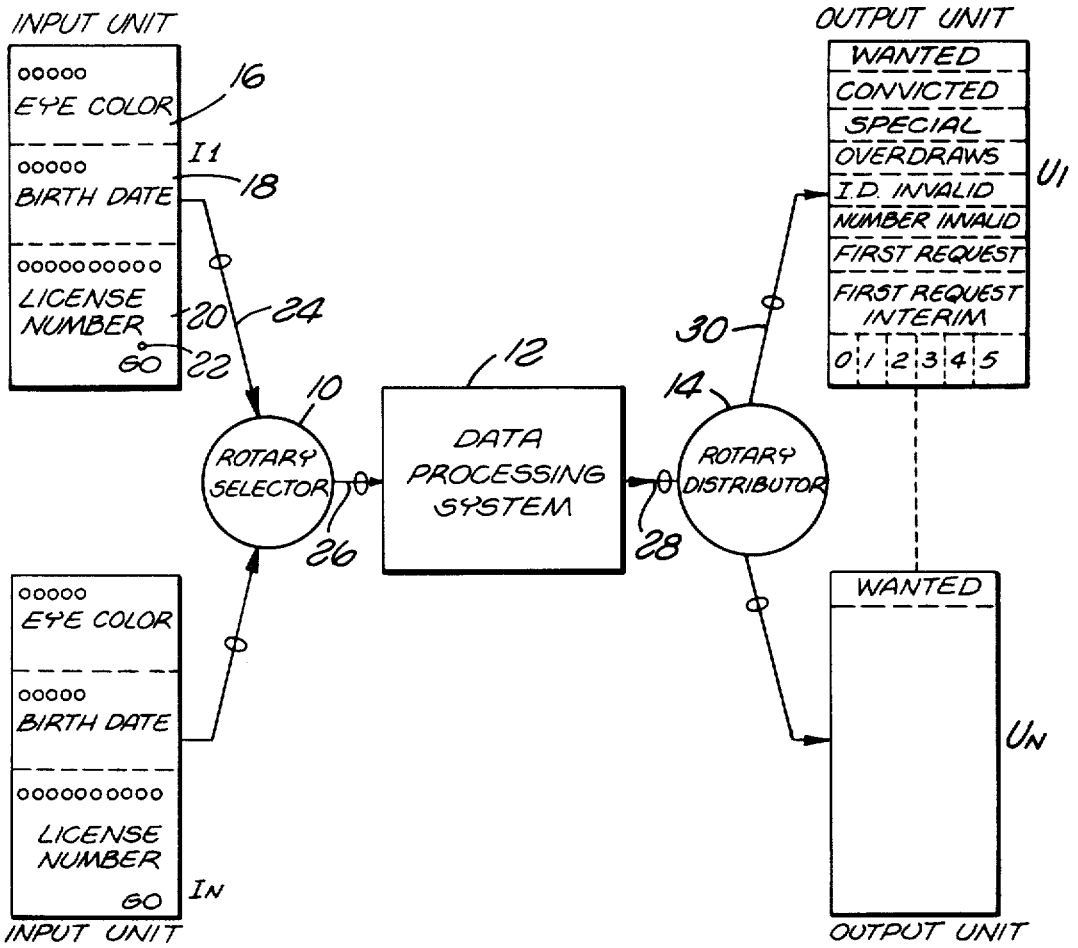
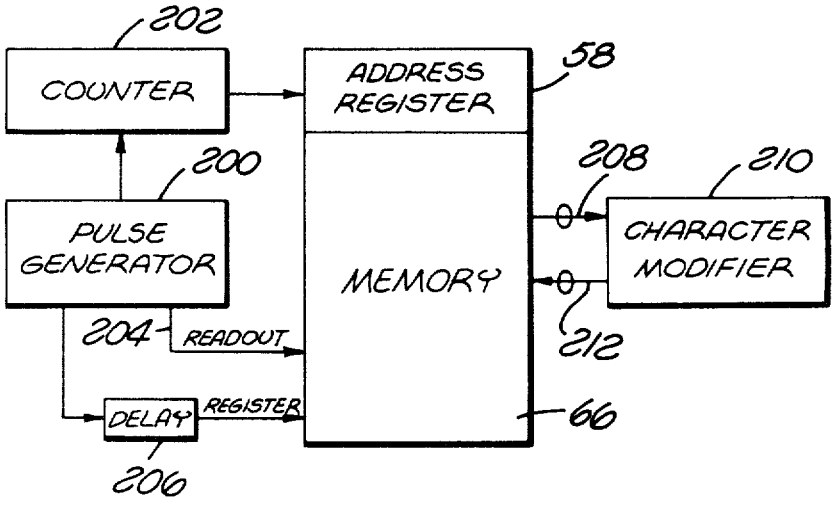
FIG. 3

CHECK AUTHORIZATION SYSTEM

Matter enclosed in heavy brackets [ ] appears in the original patent but forms no part of this reissue specification; matter printed in italics indicates the additions made by reissue.

*The present application is a divisional reissue application of U.S. Patent No. 3,212,062.*

The present invention relates to a data-processing system, and particularly to a system for providing a status report on subjects bearing assigned identification and characteristic identification.

Present day commercial activities involve a substantial number of bank checks at practically every level of commerce. A large portion of the transactions involving checks are made between total strangers so that the validity of many checks is questionable when they are accepted. Transactions of this type are particularly common in retail trade with the result that most retail merchants experience a considerable loss every year resulting from worthless checks. Of course, these losses could be limited by accepting only those checks which are recognized to be valid; however, such a policy would result in considerable loss of sales and therefore is not generally followed by retail merchants.

Various methods and devices have been employed in the past in attempts to reduce the losses resulting from worthless checks. For example, even merchants having the most liberal policy of cashing checks still request some form of identification, as a driver's license or credit card from an unknown person. Certain assigned or arbitrary identification on such a card (as a driver's license number) may then be recorded on the check for assistance in tracing the passer should the check be worthless. Although this procedure may dissuade some persons from passing worthless or bad checks, it is generally quite ineffective against professional bad-check passers and persons who are habitually overdrawn on their bank account. Generally, persons in the latter group are relatively easy to locate by their name alone; however, they possess limited property and collections from them are very difficult. As a result having accepted a bad check from a person of this type, a retail merchant must normally either spend considerable time to collect the amount due, turn the matter over to a collection agency and pay a proportionate fee, or simply dismiss the check as a business loss.

Contrary to the above category, professional passers of worthless checks are generally difficult to locate even with a form of identification, because any identification they provide is normally counterfeit or altered, so that no authentic information relative to the check passer is actually obtained when the check is accepted.

Recognizing that the practice of recording the identification presented by a person tendering a check as the only means of authenticating the value of the check is somewhat ineffective, various devices have been proposed for better control. For example, one class of such apparatus employs a camera to photograph the check passer and the check prior to cashing. Devices of this type generally reduce the losses incurred by a retail merchant; however, many good customers are reluctant to be repeatedly photographed and therefore some loss of business is attendant the use of photographic devices. Furthermore, the photograph of the check passer, in addition to any other information or identification provided, may not materially assist in collecting many worthless checks.

Another technique employed to combat losses resulting from worthless checks utilizes a personal file to provide the status of persons from whom checks have been received. Reference is then made to the file prior to accepting a check. Of course, files of this type are somewhat useful; however, if the file is maintained by an individual retail merchant, it remains quite limited and he can not usually identify a person as a bad risk until a loss is actually incurred. In the event that the file is maintained at a central office and consulted collectively by several merchants, broader scope is obtained; however, the file tends to become unwieldly and therefore time-consuming in operation. Furthermore, the file requires considerable effort to be maintained up to date.

From the above considerations, it is readily apparent that a need exists for a system of authenticating persons tendering checks to a merchant for cash or goods. In general, a satisfactory system of this type would operate very rapidly, require relatively little effort to maintain, identify a person tendering the check on the basis of arbitrary identification (e.g. driver's license) and physical characteristic identification (e.g. eye color, birth date), and be capable of registering data relative to a vast number of persons.

In general, the present invention comprises an authentication system for determining the status of a subject from arbitrary and characteristic identification. This identification is formulated into electrical signals, and the signals representative of the arbitrary identification are employed to interrogate a storage location in a memory system which registers the subject's characteristic identification and status. Upon locating this information, it is compared with the newly-provided characteristic identification as a first means of validating the authenticity of the subject. If the comparison is favorable, the subject's status is provided and may be registered in an altered form in the memory system to indicate that an inquiry has been answered. Furthermore, the system includes means for accepting and recording identification for subjects applying to be authenticated for the first time.

An object of the present invention is to provide an improved system for determining the status of a subject.

Another object of the present invention is to provide an improved system for authenticating a subject's identification and ascertaining his status.

Still another object of the present invention is to provide a fast, economical system for use in conjunction with a plurality of inquiry stations, to authenticate a subject's identification and manifest his status.

A further object of the present invention is to provide an automatic system for authenticating arbitrary and characteristic identification, and rapidly as well as conveniently providing the status of a subject so identified.

One further object of the present invention is to provide a system for authenticating the identification of persons and providing their status, which system can be maintained up to date with reasonably little effort.

These and other objects of the present invention will become apparent from a consideration of the following, taken in conjunction with drawings, wherein:

FIG. 1 is a diagrammatic representation of a system constructed in accordance with the present invention;

FIG. 3 is a diagrammatic representation of another portion of the system of FIG. 1.

Figure 2:
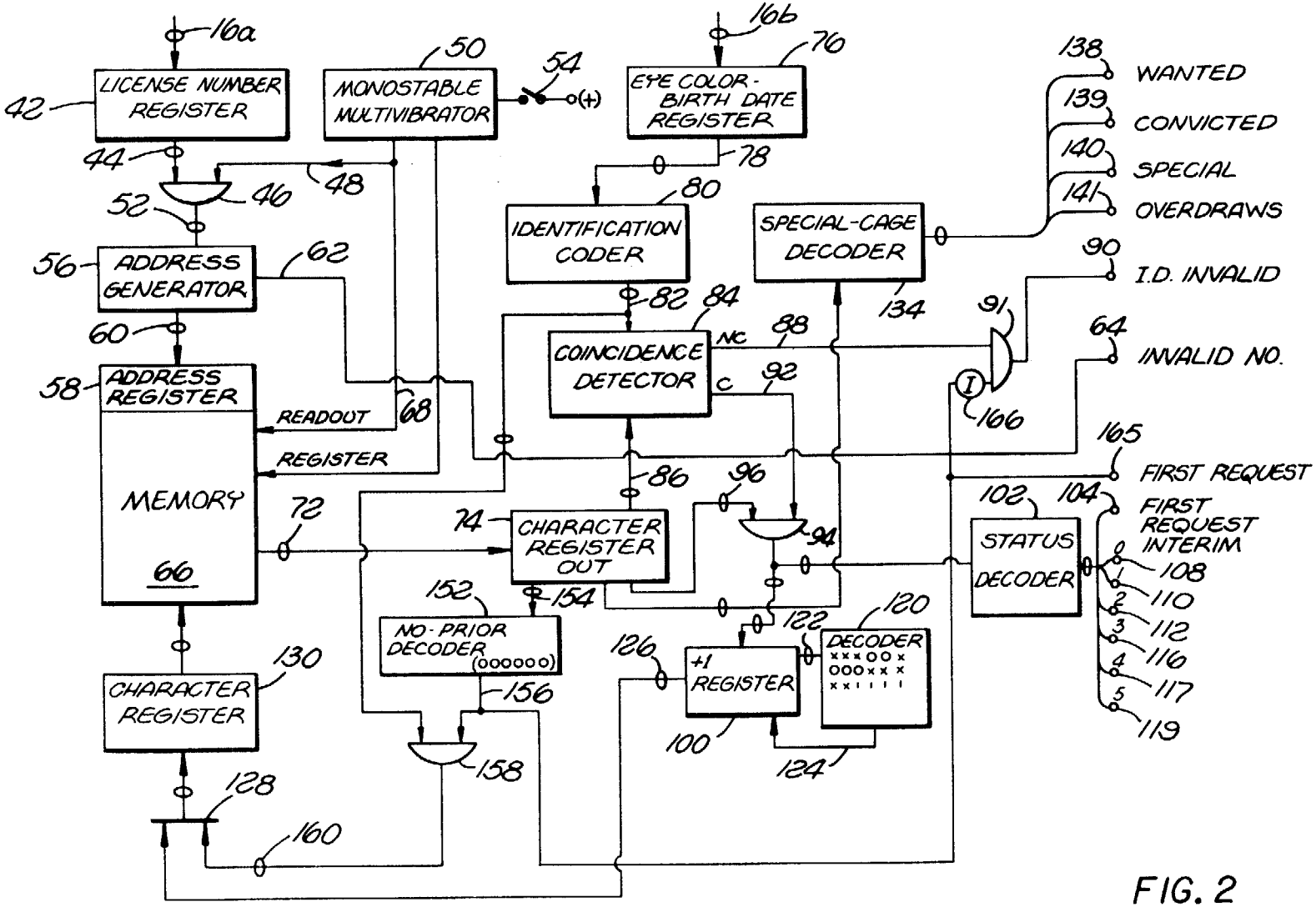
FIG. 2 is a diagrammatic representation of a portion of the system of FIG. 1.

Referring initially to FIG. 1, there are shown a plurality of input units I1 through IN. These units are similar and include various push buttons to formulate electrical signals indicative of the characteristic and arbitrary identification relating to a particular subject. The signals from all the input units are applied to a rotary selector 10 which places them in serial form for transmission in sequence into a data-processing system 12. Within the data-processing system, the assigned arbitrary identification is employed to locate a storage space reserved for the subject in question. This storage space contains the characteristic identification and status of the subject. The characteristic identification of the subject registered in the data-processing system 12 is then compared with the similar identification received from the input unit and if the comparison is favorable, the status register in the storage location is applied to a rotary distributor 14.

In the event that the comparison is not favorable, signals indicative of this fact are applied to the rotary distributor. Additionally, various other information may be applied from the system 12 to the rotary distributor, for example, signals may be provided indicating that no arbitrary identification has been assigned coinciding to that received.

The signals received by the rotary distributor 14 are passed to a series of output units U1 through UN, stationed respectively with the input units I1 through IN. Upon receiving these signals, the output units manifest them to indicate the status of the subject under investigation. Specifically, the output unit may indicate: that the subject is wanted by the authorities; that the subject has been convicted of passing bad checks; that the subject is covered by a special manual file; that the subject habitually overdraws his checking account; that the characteristic identification does not coincide with that registered for the subject; that a prior inquiry was made on the subject, however, that sufficient time for a check to clear has not passed; or that the subject's checks are generally valid and he has cashed a certain number of checks during the past week or other assigned period.

On the basis of this information, the cashier to whom a check has been tendered can make a fairly-accurate appraisal in most situations as to whether or not the check should be accepted. Furthermore, he may also inform the authorities of the presence of the person, as for example, if the subject is wanted by the authorities.

Considering the apparatus of FIG. 1 in greater detail, the input units I1 through IN may vary in number and are of similar structure. Generally, these units include three distinct sections 16, 18 and 20 which serve to formulate signals respectively representative of eye color, birth data, and driver's license number. Specifically, the section 16 has five push-buttons which identify the eye colors blue, brown, grey, green and hazel black respectively. Therefore, depression of one of these buttons formulates an electrical signal which is representative of a particular eye color. The section 18 includes five buttons which may be individually depressed to formulate electrical signals representative of birth dates falling in different parts of a month. For example, one of the buttons is employed for birth dates between the 1st and 6th days of the month, another for the days between the 7th and 12th, and so on through the days of a month in six-day increments.

The third section 20 of the input unit is employed to formulate signals representative of a subject's license number. For example, the license number may contain eight digits, and by depressing any of ten buttons in sequence, the section 20 is set up to provide signals representative of a driver's license number. In this manner, the input unit is set to manifest an eye color, a birth date category and a driver's license number. The eye color and birth date category are generally characteristic identification of the subject and are confirmed to some extent by his physical appearance. The driver's license number represents an arbitrary identification which has been assigned to the subject.

After the input unit has been properly set, a "go" button 22 is depressed to energize the binary devices affixed to the buttons and transmit parallel signals through a cable 24 representative of the subject's eye color, birth date, and license number to the rotary selector 10. In structure, the input units may comprise a variety of well known devices. For example, the push buttons may be connected to control the states of stages in a binary register which may be formed of a group of flip-flops or binary relays. Alternatively, various well-known key board structures may also be employed to form the desired signals as shown and described in U.S. Pat. No. 2,408,754 issued Oct. 8, 1946 to G. L. Bush. In any event, the signals are cleared from the input units by depressing the "go" button 22 which resets the input unit and provides parallel binary signals through the cable 24 to the rotary selector 10. In structure, this function is accomplished by an "and" gate which receives the desired signals and is qualified to pass them by the "go" button 22. Such structure is well known in the prior art and is exemplified in the above-referenced patent to Bush.

The rotary selector 10 essentially time-shares the data-processing system 12 among the units. That is, the rotary selector receives and registers input signals from all of the input units I1 through IN, and provides these signals in sequence through a cable 26 to the data-processing system 12. Various structures for the rotary selector are readily available, for example, this device may consist of a plurality of buffer registers which are connected in sequence to the data-processing system either by an electronic or an electromechanical apparatus.

The details of the data-processing system 12 will be considered below with reference to FIG. 2; however, the function of the system is to select a particular storage location therein on the basis of the subject's drivers license number. If information is possessed on the subject, the selected location contains the subject's status and his characteristic identification (eye color and birth data category). Such characteristic identification registered in the memory location is compared with the charcteristic identification provided from the input unit and in the event of coincidence, the status registered in the memory location is provided in the form of electrical signals to a cable 28.

It is to be noted, that after the inquiry has been made, the data-processing system 12 automatically alters the subject's status to indicate that the inquiry has been made. This consideration is important because the number of checks cashed by a person during a relatively short interval may be somewhat indicative of his present financial status.

The signals applied to the cable 28 by the data-processing system are received by the rotary distributor 14 and transferred to the respective output units U1-UN through cables as the cable 30. The rotary selector 10 is synchronized with the rotary distributor 14 by a mechanical coupling or by electrical clock synchronization as well known in the prior art so that the status signals are provided at the location from which the inquiry was made.

The rotary distributor 14 may take a variety of forms including units similar to those employed for the rotary selector 10.

The cable 30 from the rotary distributor 14 has several conductors which are individually connected to different sections of the output unit U1. In general, the output units U1 through UN are similar; therefore, only the output unit U1 will be considered in detail.

The conductors in the cable 30 are individually energized depending upon the status reported by the data-processing system 12. Therefore, only a single section of the output unit is energized to manifest the subject's status. Specifically, the output unit is divided into sections which are individually energized to indicate the subject's status as follows:

| Section | Definition |
|---|---|
| "Wanted" | The subject is wanted by the authorities for passing worthless checks. |
| "Convicted" | The subject has been previously convicted of passing worthless checks. |
| "Special" | The subject is a special case and reference should be made in the special file. |
| "Overdraws" | The subject habitually overdraws his account. |
| "I.D. Invalid" | The characteristic identification is not correct. |
| "Number Invalid" | The driver's license number is not valid. |
| "First Request" | This is the first request we have received relative to this subject. |
| "First Request Interim." | We have received at least one prior request on this subject's status: however, sufficient time has not lapsed for a check cashed on that occassion to clear. |
| "Zero" | The subject has previously cashed valid checks and has not cashed any checks during the current period. |
| "One" | The subject has previously cashed valid checks and has cashed one check during the current period. |
| "Two" | The subject has previously cashed valid checks and has cashed two checks during the current period. |
| "Three" | The subject has previously cashed valid checks and has cashed three checks during the current period. |
| "Four" | The subject has previously cashed valid checks and has cashed four checks during the current period. |
| "Five" | The subject has previously cashed at least five valid checks during the current period. |

In structure, the output units may consist of a variety of output devices, including a simple illuminated panel which energizes various sections in accordance with the received signal, to manifest a subject's status.

In using the system of the present invention as illustrated in FIG. 1, the cashier to whom a check is tendered simply requests the subject's driver's license. The cashier then observes the subject's eyes and approximate age, verifying this characteristic identification with the subject's physical appearance. If this identification appears satisfactory, the cashier either directly or indirectly interrogates the data-processing system through an input unit and the rotary selector. The data-processing system then locates the subject's storage location in accordance with his driver's license number and compares the presented characteristic identification with that registered for the subject. If the subject has never been checked before, the presented characteristic identification is registered for him and a signal is provided indicating that this is the first inquiry. Otherwise, the status of the subject is provided through the rotary distributor and the output unit back to the cashier to guide him in determining whether or not to cash the tendered check.

In general, the operation of the unit may be exceedingly fast with virtually the only delay of any substance occurring in the communication between the input units and the cashier. Of course, by using special telephone lines, this communication can be performed very rapidly, with the system providing a rapid and simple means of evaluating checks, which system functions with small embarrassment to customers and relative safety for merchants.

Furthermore, the system automatically builds a vast file of information which is periodically reviewed and up dated as described below in the specific description of the data processing system 12. The data-processing system as shown in FIG. 2 may be best understood by assuming certain initial conditions and proceeding with the description of the component parts in the system along with the description of their sequence of operation. Pursuing the description in this manner assume initially that a subject's driver's license number is received through a cable 16a (a portion of the conductors in the cable 16) and registered in a license-number register 42 (upper left corner) which may take the form of a multi-stage binary register. Newly-received signals destroy previously-registered signals in the register 42 in accordance with well-known techniques.

The output from the license-number register 42 is applied through a cable 44 to an "and" gate 46. The "and" gate 46 is in effect a plurality of "and" gates (one for each of the conductors in the cable 44) which are all individually qualified by a signal received through a conductor 48 from a monostable multivibrator 50. However, to preserve the legibility of FIG. 2, cables, as the cable 44 and composite gates, as the "and" gate 46 are employed.

In operation, the "and" gate 46 serves to pass the signals in all of the conductors of the cable 44 to a group of similar conductors in a cable 52 providing the high state of a two-state signal appears in the conductor 48. The signal in the conductor 48 is controlled by the monostable multivibrator 50 which is in turn controlled by a switch 54 that is closed briefly by the rotary selector 10 (FIG. 1) each time an input unit transfers signals into the data processing system 12. The brief closure of the switch 54 sets the monostable multivibrator 50 in a temporary or unstable state thereby providing a pulse in the conductor 48 to qualify the gate 46 to pass signals from the license-number register 42 to an address generator 56. In operation, the monostable multivibrator 50 automatically reverts to a stable state after a brief interval sufficient for the data-processing system to complete a functional operation and at that time provides another control pulse.

The license-number signals applied to the address generator 56 are converted into signals representing a memory address for an address register 58 and applied thereto through a cable 60. The address generator 56 may take the form of various conversion matrices and functions simply to convert driver's license numbers as may be employed in a particular state, into suitable numerical addresses. Of course, if desired the driver's license numbers can be employed directly as addresses, as may the numbers of issued licenses or cards arbitrarily assigned to persons, in which case the address generator 56 may comprise simply transfer conductors. However, if license numbers are not orderly, it may be desirable to change them to another radix. If so, any of a wide variety of radix converters or code converters may be employed, as the address generator 56, including specific examples as disclosed beginning on page 410 in the book entitled "High Speed Computing Devices" by the staff of Engineering Research Associates Inc., published in 1950. Coding systems of this type are well known in the prior art and further description is therefore not deemed necessary. However, it is to be noted that in the present system, every address is uniquely defined simply by the driver's license number or other assigned identification. Also, the memory is completely dense except for certain sections which are left unassigned.

In addition to an address, the address generator 56 also provides a signal in a conductor 62 when a false driver's license number is received. That is, the two-state signal in the conductor 62 goes to a high state upon the address register receiving an unassigned or invalid driver's license number. The conductor 62 is connected directly to a terminal 64 and provides the "invalid number" signal for the output units.

It is to be understood that certain invalid license numbers may also be carried in the memory in an alternative arrangement wherein expired and revoked licenses are recognized as such. In such instance, invalid license simply becomes another status which is manifest upon presentation of such a license number.

The address developed by the address generator 56 and registered in the address register 58 specifies a particular storage location within a memory 66. The memory is controlled by signals applied through conductors 68 and 70 from the monostable multivibrator. The application of a high signal to the memory through the conductor 68 causes the memory to provide the contents of the storage space specified by the address register 58 to a cable 72. The conductor 68 (connected to the output from the monostable multivibrator 50) receives a pulse as a license number is received; therefore, at that time, the memory is commanded to provide the contents of the address or storage-location specified by the address register 58. The signals from the selected storage location are applied to a character output register 74.

The characters provided to the register 74 are in binary form in the system of FIG. 2; however, the form of signals employed to represent these characters may take a variety of forms. The following character designations are employed in FIG. 2:

| Character | Code | Definition |
|---|---|---|
| A | 000001 | Non-Valid License Number. |
| B | 000010 | Wanted for Passing Bad Checks. |
| C | 000011 | Convicted-Passing Bad Checks. |
| D | 000100 | Reported-Not Sufficient Funds. |
| E | 000000 | No Prior Validation. |
| F | 000111 | See Special File. |
| G | 001000 | Code 1-First Timer. |
| H | 001001 | Code 1-Interim. |
| I | 001010 | Code 1-No Checks this Period. |
| J | 001011 | Code 1-One Check this Period. |
| K | 001100 | Code 1-Two Checks this Period. |
| L | 001101 | Code 1-Three Checks this Period. |

-continued

| Character | Code | Definition |
|---|---|---|
| M | 001110 | Code 1-Four Checks this Period. |
| N | 001111 | Code 1-Five Checks this Period. |
| O | 011000 | Code 2-First Timer. |
| P | 011001 | Code 2-Interim. |
| Q | 011010 | Code 2-No Checks this Period. |
| R | 011011 | Code 2-One Check this Period. |
| S | 011100 | Code 2-Two Checks this Period. |
| T | 011101 | Code 2-Three Checks this Period. |
| U | 011110 | Code 2-Four Checks this Period. |
| V | 011111 | Code 2-Five Checks this Period. |
| W | 100000 | Code 3-First Timer. |
| X | 100001 | Code 3-Interim. |
| Y | 100010 | Code 3-No Checks this Period. |
| Z | 100011 | Code 3-One Check this Period. |
| 0 | 100100 | Code 3-Two Checks this Period. |
| 1 | 100101 | Code 3-Three Checks this Period. |
| 2 | 100110 | Code 3-Four Checks this Period. |
| 3 | 100111 | Code 3-Five Checks this Period. |
| 4 | 101000 | Code 4-First Timer. |
| 5 | 101001 | Code 4-Interim. |
| 6 | 101010 | Code 4-No Checks this Period. |
| 7 | 101011 | Code 4-One Check this Period. |
| 8 | 101100 | Code 4-Two Checks this Period. |
| 9 | 101101 | Code 4-Three Checks this Period. |
| . | 101110 | Code 4-Four Checks this Period. |
| ' | 101111 | Code 4-Five Checks this Period. |
| & | 110000 | Code 5-First Timer. |
| $ | 110001 | Code 5-Interim. |
| * | 110010 | Code 5-No Checks this Period. |
| - | 110011 | Code 5-One Check this Period. |
| / | 110100 | Code 5-Two Checks this Period. |
| , | 110101 | Code 5-Three Checks this Period. |
| % | 110110 | Code 5-Four Checks this Period. |
| # | 110111 | Code 5-Five Checks this Period. |

The manner in which the characters in the above chart are manipulated in binary signal form is described below; however, preliminary thereto reconsider the interval when an inquiry is received by the data-processing system which inquiry includes the license number identification (considered above) and also the eye-age information. The latter specifically includes information relative to the subject's eye color and birth date, which information passes through a cable 16b to be accepted in a register 76 (top center FIG. 2). This register may take a variety of forms, wherein new information is registered over old information.

The signals from the register 76 are applied through a cable 78 to an identification coder 80 which functions to encode the received signals into a composite identification signal. The identification coder may take a variety of forms including a diode matrix of "and" gates to provide the desired codes. The output from the identification coder is upon a three-conductor cable 82 to represent binary code digits as set forth in the following table in accordance with particular eye colors and days of birth.

| Binary Code | Eye Color | Day of Birth |
|---|---|---|
| 001 | Blue | 1 to 6. |
| 001 | Brown | 7 to 12. |
| 001 | Grey | 13 to 18. |
| 001 | Green | 19 to 24. |
| 001 | Hazel-Black | 25 to 31. |
| 010 | Blue | 7 to 12. |
| 010 | Brown. | 13 to 18. |
| 010 | Grey | 19 to 21. |
| 010 | Green | 25 to 31. |
| 010 | Hazel-Black | 1 to 6. |
| 011 | Blue | 13 to 18. |
| 011 | Brown | 19 to 24. |
| 011 | Grey | 25 to 31. |
| 011 | Green | 1 to 6. |

-continued

| Binary Code | Eye Color | Day of Birth |
|---|---|---|
| 011 | Hazel-Black | 7 to 12. |
| 100 | Blue | 10 to 24. |
| 100 | Brown | 25 to 31. |
| 100 | Grey | 1 to 6. |
| 100 | Green | 7 to 12. |
| 100 | Hazel-Black | 13 to 18. |
| 101 | Blue | 25 to 31. |
| 101 | Brown | 1 to 6. |
| 101 | Grey | 7 to 12. |
| 101 | Green | 13 to 18. |
| 101 | Hazel-Black | 19 to 24. |

It is to be noted that the chart divides characteristic identification into categories. That is, in accordance with a subject's eye color and his birth date he is placed in a category, and with the knowledge of his eye color or his birth date (as recorded on his driver's license) there is still only one chance in five that a counterfeiter could correctly guess the other identification.

The three binary digital signals representative of the characteristic identification of a subject are applied to a coincidence detector 84 along with three similar digital signals applied through a three-conductor cable 86 from the character register 74. These digital signals represent the most-significant three digits of the code indicated by the first chart above, which are representative of the subject's previously-registered characteristic identification. The coincidence detector 84 then functions to compare the characteristic identification previously registered for a subject with that which accompanies the present inquiry, as the previously-registered characteristic identification is applied to the coincidence detector from the character register 74 while the characteristic identification accompanying the present inquiry is applied from the identification coder 80.

The coincidence detector 84 provides two opposite output signals depending upon the results of the comparison. The first output signal NC is applied to a conductor 88 and is high when the compared signals do not coincide. The occurrence of the high state of the signal NC in the conductor 88 indicates that the characteristic identification was improper and this fact is manifest through a gate 91 (considered hereafter) by a high signal at a terminal 90 to which the conductor 88 is connected.

If the coincidence detector determines that the identification information from the two sources are coincident, this fact is manifest by providing a high signal C on a conductor 92 which is the negation of the signal NC. The signal C is applied to a composite "and" gate 94 which also receives inputs from a cable 96 carrying the character registered in the character register 74. The "and" gate 94 is a composite gate as previously described and if the signal in the conductor 92 is high, the values registered in the character register 74 are all passed through the cable 96 and the gate 94 to a cable 98 which is connected to a "add-one" register 100 and a status decoder 102.

After the determination that the identification presented by the injuiry is correct, the system functions to provide the subject's status, and revise the status registered back in the memory 66. The current status is provided from the status decoder 102 which functions to provide a single status signal from a code character as set forth in the first chart above. The status decoder 102 may comprise a diode decording network and functions to accomplish the conversions set forth below.

| Code Character | Output Signal | Terminal |
|---|---|---|
| G, H, O, P, W, X, 4, 5, &, $ | "First Request" Interim | 101 |
| I, Q, Y, 6, * | "Zero" | 108 |
| J, R, Z, 7, - | "One" | 110 |
| K, S, 0, 8, / | "Two" | 112 |
| L, T, 1, 9, (.) | "Three" | 116 |
| M, U, 2, (.), % | "Four" | 117 |
| N, V, 3, °, # | "Five" | 119 |

The status coder therefore functions to energize one of the terminals 104, 108, 110, 112, 114 or 116, in accordance with the subject's status.

With regard to the matter of revising the status to indicate that another inquiry has taken place, this operation is performed by the "add-one" register 100. The contents of the "add-one" register comprise signals representative of the character taken from the memory and these signals are sensed by a decoder 120 through a cable 122. The decoder functions to form a single high signal in a conductor 124 unless a particular binary code is registered in the "add-one" register. The purpose of the decoder 120 is to maintain the existing status for certain subjects whose status does not change upon each inquiry. That is, if the register 100 contains signals representative of a status which automatically changes, i.e. "zero," "one," "two," "three," and "four," a signal is applied through the conductor 124 to the "add-one" register 100, which may take the form of an interconnected binary register capable of functioning as a counter to increase the value of its contents by "one." The conductor 124 is then connected into the least-significant stage of the register 100 so that a binary "one" is effectively added to the contents of the register. The decoder comprises a logic network which passes a pulse to the conductor 124 unless it detects binary code signals representative of XXX00X, 000XXX, or XX1111. The signals in the category XXX00X represent first timers and first timers interim. Subjects with such status do not change their status on each inquiry therefore no signal is provided to increment these status signals. Subjects identified by a status containing 000XXX are all special cases, e.g. "wanted" and therefore not subject to change on inquiry. The status category which includes the signals XX1111 is that the subject has cashed five or more checks during a current period. This status does not change with further inquiries. Of course, the categories set forth above may be verified by reference to the first chart set out above.

To manifest the altered status, the "add-one" register is connected through a cable 126 and a composite "or" gate 128 to a character register 130 which comprises the input to the memory 66. Therefore, prior to the time when a cycle of operation is deemed to be complete by the timing of the multivibrator 50, the "add-one" register 126 has registered its contents in the character register 130. The monostable multivibrator 50 then reverts to its stable state providing a pulse through the conductor 70, thereby commanding the memory to register the contents of the character register 130 in the address specified by the address register 58. As a result, the status of the subject has been sensed, manifest, possibly altered, and placed back in the proper memory location.

As indicated above certain of the code characters are placed back in the memory 66 unchanged. Among these are the characters A through F, representing special situations and identified by a binary code having the threemost significant digits zero. As a result of the operation of the decoder 120, these codes are not altered by adding one but rather are returned to the memory unchanged. To manifest these various special case codes, a special-case decoder 134 receives the character from the character register 74 and applies the appropriate signal to the proper terminal of the terminals 138 through 144. The special-case decoder may simply take the form of a diode decoder which provides signals in the lines 138, 139, 140 and 141 in accordance with code characters B, C, D and E of the first chart above.

The above description indicates the manner in which the system operates after identification for a subject has been established. However, in many instances inquiries will be made on subjects of whom the system has no prior information. An important aspect of the present invention resides in the operation of the system in such instances to automatically formulate and retain characteristic identification to accumulate an ever-increasing field of knowledge. If the system is interrogated relative to a subject for the first time, the coincidence detector 84 will register no coincidence and formulate the signal NC high, because the system has no previous knowledge of the subject's identification and only zeros are drawn from the memory unit 66. This occurrence is detected by a "no-prior" decoder 152 which is connected to the character register 74 through a cable 154. The decoder 152 simply determines the occurrence of all zeros in the character register and provides a high output signal in a conductor 156 upon such an occurrence. This signal is applied to a composite "and" gate 158 which passes the received identification from the identification coder 80 through a cable 160 and the composite "or" gate 128 to the character register 130. Therefore, the identification supplied with an initial inquiry is registered in the storage space of the memory 66 which is assigned on the basis of the arbitrary identification or driver's-license number identifying the subject.

The signal appearing in the conductor 156 from the decoder 152 is also applied to a terminal 165 to manifest no previous information is available on the subject, i.e. "first request." This signal is also applied through an inverter circuit 166 to an "and" gate 91. The inverter circuit 166 may take various well-known forms and functions to reverse or invert the state of the two-state signal from the decoder 152. Therefore the inverter circuit 166 normally (except on initial inquiries) passes high signal to the "and" gate 91 permitting the gate to pass a signal manifesting the occurrence of no-coincidence between the identification signals. However, if the current inquiry is the first inquiry, the signal NC is blocked by the gate 91.

Summarizing the operation of the system, the most common occurrence will involve an inquiry relating to a subject who has previously been considered by the system. In this instance, the system simply reports the number of checks he has cashed in a relatively-recent period (as a week) and verifies his identification. The system then functions to alter the number of checks he has cashed increasing the number by one on the assumption that the merchant accepted a check.

Occasionally, the system will receive an inquiry involving a subject who falls into a special category as being wanted by the authorities or having a record of repeated overdraws on a checking account. In this instance, this status is simply manifest and the identification is confirmed.

Still another situation which will arise occasionally involves the first-time user of the service wherein the identification of the subject is registered for future use and the system manifests no prior knowledge relative to the subject however verifies the authenticity of the driver's license number or other arbitrary identification as being a valid and active identification. Prior to the time when the system indicates that previous checks have been cashed for a subject and proven to be acceptable, the system only verifies the identification. It is generally assumed that as the identification is a valid driver's license number, the subject is a good risk and a check is accepted. However, before the subject is graduated to the status of having passed an acceptable check in the past, it is necessary to allow a period of time to pass sufficient for a check to clear. During this time, the subject retains a status of "First request interim." According to one method of operating the system, the contents of the memory is reviewed weekly and revised according to new information and what may be assumed with the passage of time. In such operation of the system it is desirable that subjects remain in the "First request interim" category for at least one week. Therefore, a subject is first placed in the category designated by code characters G, O, W, 4, &, then at the weekly updating these categories become H, P, X, 5, $, still indicating an interim stage. The next weekly review then shifts these character designations of status to I, Q, Y 6 and *. The operation of updating the system to perform these manipulations will now be considered with reference to FIG. 3.

The system of FIG. 3 represents a configuration which may be physically built into a system of the present invention or which may be alternatively employed periodically to update the contents of the memory 66. In any event, a pulse generator 200 is provided to deliver periodic pulses to a counter 202 which supplies an information count, that is, its contents representative of a numerical value to the address register 58 continually advancing the register so as to completely scan the contents of the memory. The pulse generator also applies pulses directly to the memory through a conductor 204 and through a delay circuit 206. These pulses command the operation of "reading" and "registering" by the memory 66. During the read-out operation character signals are transferred through a cable 208 to a character modifier 210 which modifies the characters in accordance with the following chart.

| Change | To | Change | To | Change | To |
|---|---|---|---|---|---|
| G | H | U | Q | 8 | 6 |
| H | I | V | Q | 9 | 6 |
| J | I | W | X | ", " | 6 |
| K | I | X | Y | ° | 6 |
| L | I | Z | Y | & | 8 |
| M | I | "0" | Y | $ | * |
| N | I | 1 | Y | - | * |
| O | P | 2 | Y | / | * |
| P | Q | 3 | Y | % | * |
| R | Q | 4 | 5 | ". " | * |
| S | Q | 5 | 6 | # | * |
| T | Q | 7 | 6 | | |

The modifier may comprise various logical networks and after its operation, the characters are returned to the memory via the cable 212 considering the above changes in view of the coded representations provided above for each character it is apparent that simple digital changes are all that are necessary. For example to accomplish the first alteration of the character G to H, the digital representation 00100 (G) is changed to 001001 (H). The logic for accomplishing this change in the modifier 210 is simply a gate to detect the presence of the representation 001001 and means to provide the representation 001001 in its place. Such a logic network may be constructed by employing the detailed teachings of Chapter 3 of the book "Arithmetic Operation in Digital Computers" by R. K. Richards, published 1955 by D. Van Nostrand Co., Inc. Alternatively, the function of the character modifier 210 may be performed by a variety of well-known general purpose computers programmed to accomplish the desired changes. One such computer is shown and described in U.S. Pat. No. 2,982,472 issued May 2, 1961 to H. D. Huskey.

Thus, the system is periodically updated to change the status of persons, after a specified period of time and furthermore the status of persons may be altered by a fluid program in the character modifier which functions to insert new data for persons of special categories. Thus, the system is maintained current in accordance with the best information available, and yet requires a minimal amount of manual effort. Furthermore, the system operates at an exceedingly high speed so that the status of a subject is returned to the inquiry station very rapidly without any embarrassing delay.

Although various features and concepts of the present invention have been set forth in the foregoing illustrative embodiment, the present invention is not to be limited in accordance therewith but is to be construed in accordance with the claims set forth below.

What is claimed is:

1. A data-processing system comprising: means for formulating signals representative of an arbitrary identification and a characteristic identification; a memory file; means employing said signals representative of an arbitrary identification to address a location in said memory file for registering signals representative of a characteristic identification; determination means for determining the presence of signals in a location in said memory file representative of a characteristic identification; means for registering said signals representative of a characteristic identification controlled by said determination means upon determining no such signals to be registered in a location in said memory file; means to compare any existing signals from said memory file representing a characteristic identification with signals formulated to represent a characteristic identification, controlled to operate conditionally upon said determination means determining the presence of characteristic identification signals in said memory file; and means to manifest the occurrence of coincidence between signals received by said means to compare.

2. Apparatus according to claim 1 wherein said characteristic identification comprises a composite characteristic identification formulated from a plurality of individual separate characteristics, and said means for formulating signals includes means for formulating signals representative of said composite characteristic identification from signals representing said individual characteristics.

3. Apparatus according to claim 1 wherein said locations in said memory further register status signals representing a current status related to number of inquiries, and including means for automatically revising said status signals upon each sensing thereof until a predetermined value is reached.

4. A data-processing system for use in conjunction with a plurality of inquiry stations for providing a status report on any of plural subjects, each bearing arbitrary identification and characteristic identification, comprising: means for forming input signals representative of a subjects arbitrary identification and characteristic identification; a memory means having a multitude of storage locations, each for registering a subjects registered characteristic identification and status; means for interrogating said memory means to provide signals representative of a subjects registered characteristic identification of a subjects arbitrary identification, providing such signals are registered; means for registering said input signals representative of a subjects characteristic identification in a storage location under control of said signals representative of a subjects arbitrary identification, providing no such signals are registered; and means for manifesting a subjects status providing the said input characteristic identification signals coincide with the registered characteristic identification signals.

5. A data processing system for use in conjunction with a plurality of inquiry stations for providing a status report on subjects bearing arbitrary identification and characteristic identification, comprising: means for forming input signals representative of a subjects arbitrary identification and characteristic identification; a memory means having a multitude of storage locations, each for registering registered signals representative of characteristic identification and status; means for interrogating said memory means to provide said registered signals representative of a subjects characteristic identification and status, under control of said input signals representative of a subjects arbitrary identification, providing such registered signals are registered; comparison means for comparing registered signals representative of a subjects characteristic identification from said memory means with similar input signals from said means for forming signals to verify the validity of a subjects identification upon each of, coincidence of compared signals, and no signals being registered representative of a subjects characteristic identification; and means for manifesting a status for subjects, controlled by the status registered in a storage location of said memory means and said comparison means.

6. A data-processing system for use in conjunction with a plurality of inquiry stations for providing a status report on any of a plurality of subjects being arbitrary identification and characteristic identification, comprising: means for forming input signals representative of a subjects arbitrary identification and characteristic identification; a memory means having a multitude of storage locations, each for registering registered signals representation of a subjects characteristic identification and status; means for interrogating said memory means to provide said registered signals representative of a subjects characteristic identification and status under control of said input signals representative of a subjects arbitrary identification, providing such signals are registered; means for registering said input signals representative of a subjects characteristic identification in a storage location under control of said input signals representative of a subjects arbitrary identification, providing no such signals are registered; comparison means for comparing registered signals representative of a subjects characteristic identification from said memory means with similar input signals from said means for forming signals to verify the validity of a subjects identification; and means for manifesting a status for subjects, controlled by the registered signals representative of status registered in a storage location of said memory means and said comparison means verifying characteristic identification by comparison or detecting absence of prior registration.

7. Apparatus according to claim 6, wherein said means for forming input signals includes means for forming composite characteristic identification signals from signals representative of a plurality of physical characteristics of said subject.

[8. Apparatus according to claim 6 wherein said storage locations may register any of a plurality of status signals, and wherein said apparatus includes means for automatically incrementing the registered status signals registered upon each sensing of the related storage location until a predetermined value is reached.]

9. An indentification-verifying status-reporting system comprising: input means for forming electrical input signals representative of a characteristic identification and an arbitrary identification for a selected subject; memory means having a plurality of storage locations for registered signals representative of a characteristic identification and a status for an individual subject; means for addressing the storage locations in said memory means under control of said input signals representative of an arbitrary identification; detection means for determining the presence of registered signals in an addressed storage location; means controlled by said detection means for registering said input signals representative of a characteristic identification in said addressed storage location upon no registered signals being therein; means controlled by said detection means for comparing said input signals representative of said characteristic identification with said registered signals representative of said characteristic identification in said addressed storage location upon signals being therein, to provide a control signal upon the occurrence of signal coincidence; and means for manifesting the status signals from an addressed storage location under control of said control signal.

[10. An identification-verifying status-reporting system comprising: input means for forming electrical input signals representative of a characteristic identification and an arbitrary identification for a selected subject; memory means having a plurality of storage locations for registered signals representative of a characteristic identification and a status for an individual subject; means for addressing the storage locations in said memory means under control of said input signals representative of an arbitrary identification; detection means for determining the presence of registered signals in an addressed storage location; means controlled by said detection means for comparing said input signals representative of said characteristic identification with said registered signals representative of said characteristic identification in said addressed storage location upon signals being therein, to provide a control signal upon the occurrence of signal coincidence; means for manifesting the status signals from an addressed storage location under control of said control signal; and means for automatically altering said status signals in each storage location, each time said location is addressed whereby to indicate such occurrence.]

[11. A system for verifying the credit status of a subject comprising: input means for forming electrical input signals representative of identification for the subject; memory means having a plurality of storage locations, each for registered signals representative of a status for a subject; means for addressing the storage locations in said memory means under control of said input signals; means for manifesting the status signals from an addressed storage location under control of said input signals; and means for automatically altering said status signals in each storage location by a uniform increment, each time said location is addressed until a predetermined value of said status signals is registered.]

*12. Apparatus according to claim 1 wherein said location in said memory further register status signals representing a current status related to number of inquiries, and including means for automatically revising said status signals upon each sensing thereof unless a predetermined value is reached.*

* * * * *